US010823816B2

(12) United States Patent
Zdroik et al.

(10) Patent No.: US 10,823,816 B2
(45) Date of Patent: Nov. 3, 2020

(54) PLANER BOARD LOCATION SYSTEM

(71) Applicant: iTroll LLC, Stevens Point, WI (US)

(72) Inventors: Brad Zdroik, Stevens Point, WI (US); Matt Lazarski, Stevens Point, WI (US)

(73) Assignee: ITroll, LLC, Stevens Point, WI (US)

( * ) Notice: Subject to any disclaimer, the term of this patent is extended or adjusted under 35 U.S.C. 154(b) by 406 days.

(21) Appl. No.: 15/916,999

(22) Filed: Mar. 9, 2018

(65) Prior Publication Data
US 2018/0306893 A1 Oct. 25, 2018

Related U.S. Application Data

(60) Provisional application No. 62/487,866, filed on Apr. 20, 2017.

(51) Int. Cl.
| | |
|---|---|
| *G01S 5/02* | (2010.01) |
| *G01S 19/14* | (2010.01) |
| *A01K 97/00* | (2006.01) |
| *A01K 93/02* | (2006.01) |
| *A01K 91/08* | (2006.01) |

(52) U.S. Cl.
CPC ............ *G01S 5/0268* (2013.01); *A01K 91/08* (2013.01); *A01K 93/02* (2013.01); *A01K 97/00* (2013.01); *G01S 19/14* (2013.01)

(58) Field of Classification Search
USPC .......................................................... 701/21
See application file for complete search history.

(56) References Cited

U.S. PATENT DOCUMENTS

| | | | |
|---|---|---|---|
| 5,884,213 A | 3/1999 | Carlson | |
| 6,874,271 B2 | 4/2005 | Lieb | |
| 7,113,449 B2 | 9/2006 | Fairbairn | |
| 7,644,534 B2 * | 1/2010 | Hagen | A01K 91/08 43/43.13 |
| 7,971,386 B2 * | 7/2011 | Garrett | A01K 91/08 43/43.13 |
| 8,731,748 B2 | 5/2014 | Haymart et al. | |
| 9,132,900 B2 | 9/2015 | Salmon et al. | |
| (Continued) | | | |

OTHER PUBLICATIONS

Planer Boards for Trolling Walleyes. In-Fisherman. Aug. 2, 2012. http://www.in-fisherman.com/walleye/planer-board-for-trolling-walleyes/.
(Continued)

*Primary Examiner* — Tyler D Paige
(74) *Attorney, Agent, or Firm* — Quarles & Brady LLP

(57) ABSTRACT

A system for providing the location of a planer board is provided. In an embodiment, the system includes one or more computer devices and one or more computer processors. The system includes (A) a planer board application (planer board app) embodied in instructions stored by the one or more computer devices. When the planer board app is executed by the one or more computer processors, the planer board app is configured to: (i) receive inputs from a GPS locator module. The planer board app is further configured to receive user inputs for (ii) a lure line length for a planer board and (iii) a boat line length to the planer board. (B) The planer board app generates a planer board track based on the inputs from (i)-(iii). (C) The planer board app also includes a user interface, such that the planer board app is further configured to display the planer board track on the user interface.

14 Claims, 3 Drawing Sheets

(56) References Cited

U.S. PATENT DOCUMENTS

| | | | |
|---|---|---|---|
| 9,522,721 B2 | 12/2016 | Grace et al. | |
| 2007/0173139 A1* | 7/2007 | Gierke | A01K 97/00 |
| | | | 440/6 |
| 2016/0278360 A1 | 9/2016 | Battah et al. | |
| 2018/0306893 A1* | 10/2018 | Zdroik | A01K 91/08 |

OTHER PUBLICATIONS

Precision Trolling Data. Android Apps on Google Play. May 6, 2017. https://play.google.com/store/apps/details?id=com.precisiontrollingdata.precisiontrollingdata&hl=en.

* cited by examiner

PLANER BOARD LOCATION SYSTEM

BACKGROUND

Trolling is a method of fishing where one or more fishing lines (or lines), baited with lures or live bait, are drawn through the water. The fishing lines are pulled behind or alongside a moving boat. While trolling, an angler is not actively casting, but rather, the angler is pulling single or multiple lines through the water in an attempt to find fish.

One method of trolling includes running multiple lines from the sides of the boat and/or from the back of the boat using planer boards. A planer board is a buoyant plastic or wooden structure that is pulled behind or alongside a boat. A first length of line is let off the fishing rod with the lure, and the planer board is attached to the line. The first length of line determines how far back the lure runs from the planer board. Then, a second length of line is let off from the planer board to the rod/reel combination. The second length of line determines how far the planer board runs from the boat. Line measurement can be determined by line-counting reels. With planer boards, multiple lines can be trolled on each side of the boat, as well as off the stern. Planer boards enable the angler to position multiple lines at various distances from the boat. Planer boards also prevent interference or tangling between the multiple lines.

When trolling with multiple planer boards, it is problematic to determine where each planer board is actually riding. Conventional dive charts for lures predict the depth of the lure with respect to the planer board, yet these dive charts fail to inform the angler where the planer board is with respect to the boat. As such, the angler is left with only an imprecise estimate as to where the planer board is running during trolling.

The art therefore recognizes a need for a system that predicts and/or displays the location of the planer board (and optionally the location of the lure) during trolling for fish. The art further recognizes the need for a mobile device application that can display and/or save the location of the planer board during fish trolling.

SUMMARY

The present disclosure provides a system. In an embodiment, a system for providing the location of a planer board is provided and includes one or more computer devices and one or more computer processors. The system includes (A) a planer board application (planer board app) embodied in instructions stored by the one or more computer devices. When the planer board app is executed by the one or more computer processors, the planer board app is configured to: (i) receive inputs from a GPS locator module. The planer board app is further configured to receive user inputs for (ii) a lure line length for a planer board and (iii) a boat line length to the planer board. (B) The planer board app generates a planer board track based on the inputs from (i)-(iii). (C) The planer board app also includes a user interface, such that the planer board app is further configured to display the planer board track on the user interface.

DEFINITIONS

Figure 1:
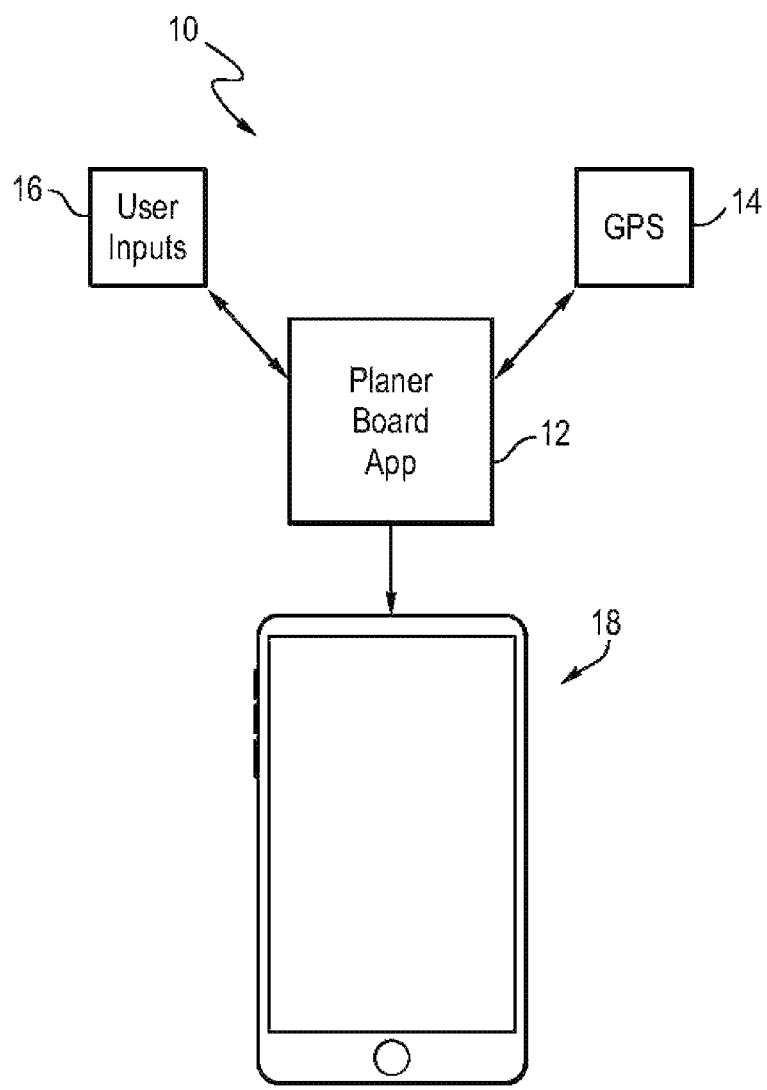
FIG. 1 is a schematic representation of a planer board location system in accordance with an embodiment of the present disclosure.

"Application software" (an "application" or an "app") is a set of computer programs designed to permit the user to perform a group of coordinated functions, tasks, or activities. Application software cannot run on itself but is dependent on system software to execute. A mobile application (or "mobile app") is application software developed specifically for use on small, wireless computing devices, such as smartphones and tablets, rather than desktop computers or laptop computers.

A "boat heading" is the direction in which the boat is travelling or the direction in which the front of the boat (i.e., the bow of the boat) is pointed towards, such as north, east, south, and west. It is understood that when the boat is travelling in reverse, the boat heading is the direction in which the rear of the boat (i.e., the stern of the boat) is pointed towards.

The term "communicates" or "in communication with" or "communicatively connected," "communicatively linked" and like terms denotes a link between two or more objects (i.e., a link between two or more modules, units, sub-units, computing devices, processors, servers, etc.) that enables two-way exchange of information and includes a wired connection, a wireless connection, and combinations thereof.

The terms "comprising," "including," "having," and their derivatives, are not intended to exclude the presence of any additional element, component, step or procedure, whether or not the same is specifically disclosed. In contrast, the term, "consisting essentially of" excludes from the scope of any succeeding recitation any other element, component, step or procedure, excepting those that are not essential to operability. The term "consisting of" excludes any element, component, step, or procedure not specifically delineated or listed.

A "computing device" (or "a computer readable device") is a non-transitory computing device with a central processing unit (CPU), random access memory (RAM), and a storage medium (such as hard disk drive, solid state drive, flash memory, cloud storage. Nonlimiting examples of computing devices include personal computers (PCs), smart phones, laptops, mobile computing devices, tablet PCs, and servers. The term "computing device" may also describe two or more computing devices communicatively linked in a manner as to distribute and share one or more resources, such as clustered computing devices and server banks/farms. It is understood that any number of computing devices could be used, and embodiments of the present disclosure are contemplated for use with any computing device.

The Global Positioning System (GPS) is a space-based radio-navigation system owned by the United States government and operated by the United States Air Force. It is a global navigation satellite system that provides geolocation and time information to a GPS receiver anywhere on or near the Earth where there is an unobstructed line of sight to four or more GPS satellites.

The "Internet" refers to interconnected (public and/or private) networks that may be linked together by protocols (such as TCP/IP and HTTP) to form a globally accessible distributed network. While the term Internet refers to what is currently known (e.g., a publicly accessible distributed network), it also encompasses variations which may be made in the future, including new protocols or any changes or additions to existing protocols.

A "mobile application," (or "mobile app"), is a type of software application designed to run on a mobile device, such as a smartphone or a tablet computer. Mobile applications frequently serve to provide users with similar services to those accessed on PCs. Mobile apps are generally small, individual software units with limited function. Mobile apps typically are Internet applications that run on smartphones, computer tablets (such as iPad available from Apple, or Surface available from Microsoft). Some mobile apps take personal computer (PC)-based applications and port them to a mobile device.

A "mobile device" is a portable, wireless computing device that is small enough to be used while held in the hand; a hand-held device. A mobile device typically has a user interface display screen with touch input and/or a miniature keyboard and weighs less than 0.91 kilograms (kg) (2 pounds). A mobile device typically has an operating system (OS) and can run various types of application software (apps). Nonlimiting examples of a mobile device include smartphone, personal digital assistant (PDA), and tablet computer.

A "planer board" is a buoyant plastic or wooden structure that is pulled behind or along a side of a boat. A planer board is typically made from buoyant plastic or wood, and has a rectangular shape with a tapered front end to minimize diving and flying. A planer board is used to increase the width of a trolling spread, and allow for more versatility in the presentation of the bait or lure than when a line is simply run out behind a boat. A planer board can include, without limitation, fins (e.g., side fins), adjustable weights to keep the planer board tracking, line clip mechanisms, a strike release, a flag (e.g., a spring-loaded flag with, for example, an adjustable tension indicator), and/or a light (e.g., for night fishing).

The planer board can be an inline board (also known as a sideplaner board) or a dual board (also known as mast-style planer boards). An inline board attaches directly to the fishing line, while a dual board is attached to a mast-mounted tow-line with the fishing lines attached to the tow-line. A typical inline board can be, for example, about 10 inches×3½ inches or smaller, while a typical mast planer board are considerably larger (e.g., some dual planer boards can have ten times the surface area of inline planer boards).

A "planer board boat side" is the side of the boat to which an end of the boat line length is attached (with the other end of the boat line length being attached to the planer board). The planer board boat side may be the left side (i.e., the port side) of the boat, the right side (i.e., the starboard side) of the boat, the front (i.e., bow) of the boat, or the back (i.e., the stern) of the boat.

A "server" is a computer program that provides services to other computer programs (and their users) in the same or other computing devices. The computing device that a server program runs in is also frequently referred to as a server (though it may be used for other purposes as well). In the client/server programming model, a server is a program that awaits and fulfills requests from client programs in the same or other computing devices. A given application in a computing device may function as a client with requests for services from other programs and also as a server of requests from other programs. Specific to the Web, a Web server is the computer program (housed in a computing device) that serves requested HTML pages or files. A Web client is the requesting program associated with the user. For example, the Web browser in a home PC is a client that requests HTML files from a Web server.

"Wireless communication" is one or more wireless technologies such as Near Field Communications (NFC), Wi-Fi, infrared, Bluetooth, or one or more variants of wireless cellular technology.

A "web site" refers to a system that serves content over a network using the protocols of the World Wide Web. A web site may correspond to an Internet domain name, and may serve content associated or provided by an organization. The term may encompass (i) the hardware/software server components that serve objects and/or content over a network, and/or (ii) the "backend" hardware/software components, including any standard, non-standard or specialized components, that may interact with the server components that provide services for Web site users.

The "World Wide Web" (or "Web") refers to (i) a distributed collection of user-viewable or accessible documents (that may be referred to as Web documents or Web pages) or objects that may be accessible via a publicly accessible distributed network like the Internet, and/or (ii) the client and server software components which provide user access to documents and objects using communication protocols. A protocol that may be used to locate, deliver, or acquire Web documents or objects through HTTP (or other protocols), and the Web pages may be encoded using HTML, tags, and/or scripts. The terms "Web" and "World Wide Web" encompass other languages and transport protocols including or in addition to HTML and HTTP that may include security features, server-side, and/or client-side scripting.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

DETAILED DESCRIPTION

In an embodiment, a system for providing the location of a planer board k provided and includes one or more computer devices and one or more computer processors. The system includes (A) a planer board application (planer board app) embodied in instructions stored by the one or more computer devices. When the planer board app is executed by the one or more computer processors, the planer board app is configured to: (i) receive inputs from a GPS locator module. The planer board app is further configured to receive user inputs for (ii) a lure line length for a planer board and (iii) a boat line length to the planer board. (B) The planer board app generates a planer board track based on the inputs from (i)-(iii). (C) The planer board app also includes a user interface, such that the planer board app is further configured to display the planer board track on the user interface.

The present system provides the location of a planer board while trolling. Referring to FIG. 1, a system 10 includes one or more computer devices and one or more computer processors. It is understood that system 10 (i) can include one or more computing devices (ii) that operate over one or more networks and/or one or more servers and (iii) provide services by implementing the execution of code modules on the one or more computing devices. Each of the processes, described in the following sections with respect to system 10 may be embodied in, and fully or partially automated by, code modules executed by one or more computers or computer processors. The code modules may be stored on any type of non-transitory computer device, non-transitory computer-readable medium or computer storage device, such as hard drives, solid state memory, optical disc, and/or the like. The "code modules" are instructions, processes and algorithms stored by the one or more computer devices that may be implemented partially or wholly in circuitry. The results of the disclosed processes and process steps may be stored, persistently or otherwise, in any type of non-transitory computer storage such as, e.g., volatile or non-volatile storage. Communication between the computer devices may be by way of wire connection and/or wireless connection and may utilize the World Wide Web and/or cloud computing.

The system 10 includes an application software for planer board location ("planer board app"). The planer board app 12 can be a stand alone app, such as a mobile app, for example. Alternatively, the planer board app can be a software component integrated into a larger software program and/or integrated into a larger hardware device.

The planer board app 12 is embodied in instructions stored by the one or more computer devices. When executed by the one or more computer processors, the planer board app 12 is configured to receive inputs from a GPS locator 14. The GPS locator 14 provides one, some, or all of the following inputs to the planer board app 12:
   (i) boat location (alone or in combination with boat heading); and/or
   (ii) boat speed; and/or
   (iii) current time.

In an embodiment, the planer board app is a software component of the GPS locator.

In an embodiment, the GPS locator is an aquatic locator. The aquatic locator may or may or not include SOund Navigation And Ranging (SONAR) capability. The aquatic locator may or may not include the ability to display the boat's GPS position overlaid on a contour map and/or a bathymetric lake map (hereafter referred to as "cartography") on a mobile device. Nonlimiting examples of providers for cartography include Navionics™ and Lakemaster™. Nonlimiting examples of providers of aquatic locators include Humminbird™, Lowarance™, Raymarine™, and Garmin™.

In addition to the inputs provided by the GPS locator, the aquatic locator provides one, some, or all of the following inputs to the planer board app 12;
   (iv) weather conditions (temperature, wind, water current); and/or
   (v) a graphic display of the cartography of the body of water upon which the angler (i.e., the user of system 10) is trolling.

In an embodiment, the planer board app 12 is a software component of the aquatic locator.

In FIG. 1, the planer board app 12 is further configured to receive user inputs 16. User inputs 16 include:
   (i) a lure line length for a planer board; and
   (ii) a boat line length to the planer board.
Other optional user inputs 16 include:
   (iii) planer board type; and/or
   (iv) fishing line type; and/or
   (v) planer board boat side; and/or
   (vi) lure type.

Figure 2:
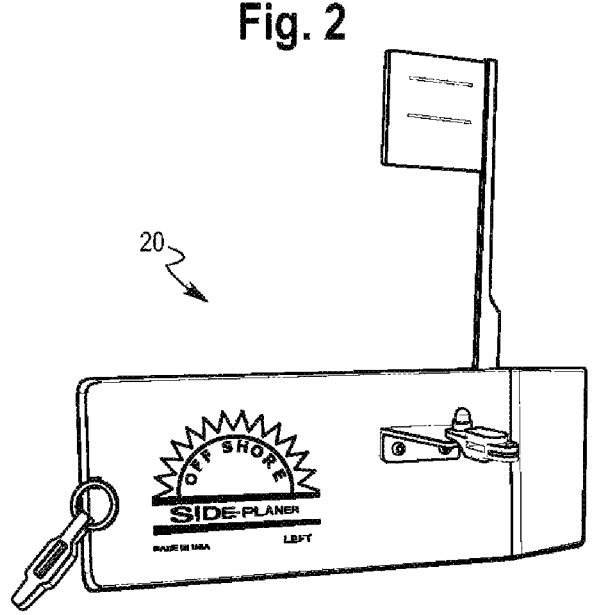
FIG. 2 is a perspective view of a planer board.
Figure 3:
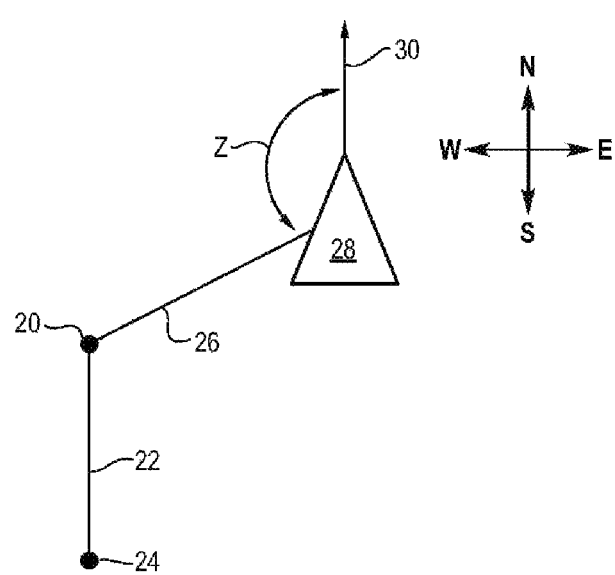
FIG. 3 is a schematic representation of a display of a planer board track in accordance with another embodiment of the present disclosure.
Figure 4:
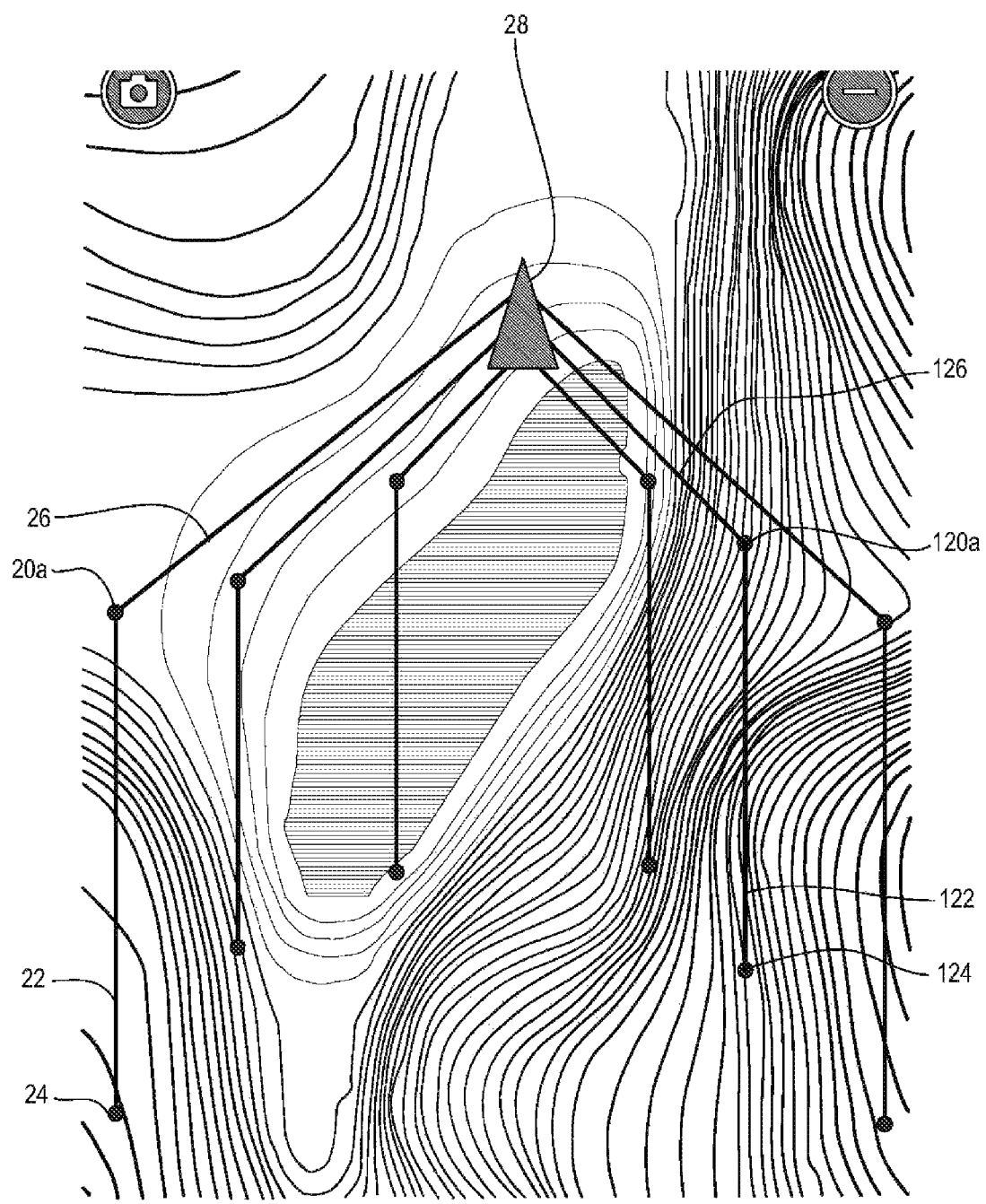
FIG. 4 is a schematic representation of a display of planer board tracks in accordance with an embodiment of the present disclosure.

A user, such as an angler (the angler and the user of the system 10 may or may not be the same person) enters the lure line length into the planer board app 12. It is understood that the planer board app 12 communicates with a suitable graphical user interface to enable receipt of the user input 16 into the system 10. For example, user inputs may be entered into the planer board by way of a graphical user interface on the GPS locator module. It is understood the GPS locator module is present on a boat from which the user is fishing. The GPS locator module may be affixed to the boat, or the GPS locator may be a hand-held device. The planer board app and the GPS locator may be components of the same handheld device, such as a smartphone, for example. Alternatively, user inputs may be entered by way of a mobile device (such as a smartphone, for example) that is in communication with the planer board app. The "lure line length" is the length of the fishing line from the lure/bait to the planer board. FIG. 2 shows a nonlimiting example of a planer board 20. FIG. 3 shows lure line length 22 extending between lure 24 and planer board 20. FIG. 4 shows lure line length 22 extending between lure 24 and planer board 20a.

The planer board is then cast from the boat. The user then enters a boat line length into the planer board app. The "boat line length" is the length of the fishing line from the planer board to the boat. FIG. 3 shows boat line length 26 extending from the planer board 20 to boat 28. FIG. 4 shows boat line length 26 extending from the planer board 20a to boat 28.

The planer board app 12 generates a planer board track based on the inputs from the GPS locator 14 and the user inputs 16, The planer board app 12 has suitable logic, data processing capacity, and memory to receive the inputs from (i) the GPS locator 14 (and/or the aquatic locator) and (ii) the user inputs 16. From the inputs, the planer board app 12 generates a planer board track and/or a lure track. A "planer board track" is one or more predicted location points for the planer board on a body of water, the planer board track generated by planer app logic and based on GPS locator inputs 14 and user inputs 16. The planer board app 12 can store the planer board track in suitable memory. In an embodiment, the planer board track is generated by planer app logic using one or more equations.

In an embodiment, the inputs received (i) from the GPS locator 14 include (1) a boat speed and (2) a boat heading 30. The planer board app 12 generates the planer board track based on (i)(1) the boat speed, (i)(2) the boat heading 30, (ii) the lure line length 22, and (iii) the boat line length 26.

In an embodiment, the planer board app 12 calculates a drag angle from the inputs, including (i)(1) the boat speed, (i)(2) the boat heading 30, (ii) the lure line length 22, and (iii) the boat line length 26. The planer board app 12 generates the planer board track from the drag angle. The "drag angle" is the angle, Z, between the planer board 20 (or the boat line length 26) and the boat heading 30 resulting from the pull or drag imparted upon the planer board from the speed and heading of the moving boat 28, as shown in FIG. 3. In other words, the drag angle accounts for the phenomenon that the faster the boat speed, the more drag or pull upon the planer board, thereby influencing the position of the planer board with respect to the boat 28. Planer app logic and/or code modules in the planer board app 12 calculate the drag angle.

In an embodiment, the planer board app 12 generates the planer board track based on changes to the inputs, including (i)(1) the boat speed, (i)(2) the boat heading 30, (ii) the lure line length 22, and (iii) the boat line length 26, in realtime.

In an embodiment, the planer board app calculates the drag angle using one or more equations, such as Equation (1):

$$\text{Drag Angle} = 90° + (\text{Boat Speed} \times A) \qquad \text{Equation (1)},$$

wherein
   A is a drag coefficient; and the Drag Angle ≤180°.

The drag coefficient A of Equation (1) is a numeric value from greater than 0 to 90. In an embodiment, the drag coefficient A of Equation (1) is an integer from 1, or 2, or 3, or 4, or 5, or 6, or 7, or 8 to 9, or 10. In an embodiment, the drag coefficient A of Equation (1) is 9. The drag coefficient A of Equation (1) may be selected or generated by the planer board app logic based on the inputs.

The Drag Angle of Equation (1) is less than or equal to 180°. When the drag angle is equal to 180°, the planer board is positioned opposite the boat heading.

In an embodiment, the drag coefficient A of Equation (1) is 9. In other words, the planer board app logic calculates the drag angle using Equation (2):

$$\text{Drag Angle}=90°+(\text{Boat Speed}\times 9) \quad \text{Equation (2)},$$

wherein the Drag Angle ≤180°.

In an embodiment, the planer board track is generated by planer app logic or code modules by (i) receiving input from the GPS locator that identifies the location, (1) speed, and (2) heading of the boat; (ii) receiving user inputs that identify the lure line length 22; (iii) receiving user inputs that identify the boat line length 26; and (iv) receiving user inputs that identify the planer board boat side. The planer board app logic generates the planer board track using Equation (2). Under Equation (2), when a boat is not moving (i.e., has a boat speed of 0 mph), the drag angle is 90° from the boat heading. Furthermore, under Equation (2), when a boat is moving at a speed of 10 mph or more, the drag angle is 180° from the boat heading.

Using Equation (1) and/or Equation (2), the planer board app logic can dynamically generate the planer board track as conditions change (e.g., when the speed of the boat changes). In other words, the planer board app logic calculates realtime and updates periodically, or in realtime, based changes to the inputs. For example, referring to FIG. 3, the (i) GPS locator inputs (1) speed, (2) heading 30, and (3) location of the boat 28 to the planer board app. In FIG. 3, the boat 28 is heading north at a speed of 3 mph. A user inputs (ii) the lure line length 322 of 50 feet, (iii) the boat line length 326 of 75 feet, (iv) and the planer board boat side of left (i.e., port) to the planer board app. In an embodiment, the user inputs the planer board 20 type, the fishing line type, and/or the lure 24 type to the planer board app. The planer board app logic utilizes the user inputs and the GPS inputs to generate the planer board track. In an embodiment, the planer board app logic utilizes Equation (2), which generates a drag angle, Z, of 117° from the boat heading 30. The planer app logic generates the planer board track of 117° to the left of the boat's heading 30 and 75 feet away from the boat, as shown in FIG. 3.

It is understood that the planer board app logic may generate the planer board track using equations other than Equation (1) and Equation (2), including equations that account for variables such as the fishing line type, the weather conditions (temperature, wind, water current), and the lure type to determine the planer board track and/or the lure track. In an embodiment, the drag coefficient A of Equation (1) is selected or generated by the planer board app logic based on the inputs, which account for variables such as the fishing line type, the weather conditions (temperature, wind, water current), and the lure type to determine the planer board track and/or the lure track. For example, when a first lure type imparts more drag on a planer board than a second lure type, the planer board app logic selects a higher drag coefficient A for calculating the drag angle for the first lure type than the second lure type.

Although FIG. 3 shows one planer board 20 (with a respective lure 24) being trolled from boat 28, it is understood that two, three four, five, six, seven, eight, nine, 10 or more planer boards with respective lures, line length, and boat line length inputs can be input into the planer board app with respective tracks displayed on a user interface as described above. Thus, the planer board app logic generates the planer board track for more than one planer board at a time (e.g., 2, or 3, or 4, or 5, or 6 planer board tracks).

The planer board app includes a user interface, such that the planer board app 12 is further configured to display the planer board track on the user interface. In an embodiment, the planer board app 12 is configured to display the planer board track on a cartography on the user interface. In a further embodiment, the planer board app displays the planer board track on a cartography on the user interface, showing motion of the boat 28 and the planer board track on the display in realtime. FIG. 3 shows boat 28 and the planer board track on a graphical user interface display.

In an embodiment, the planer board app 12 generates a lure track. A "lure track" is one or more predicted location points for the lure in a body of water, the lure track generated by planer app logic and based on GPS locator inputs 14 and user inputs 16. The planer board app 12 can store the lure track in suitable memory. In an embodiment, the lure track is generated by planer app logic using a lure track calculation.

In an embodiment, the lure track is generated by planer app logic using a lure track calculation. The lure track calculation may be performed using one or more equations, including Equation (1) and/or Equation (2). The planer board app logic calculates the lure track based on the inputs from (i)-(iii). The planer board app is configured to display the lure track on the user interface.

In an embodiment, each track (planer board track and/or lure track) is calculated realtime and updated periodically based on movement of the boat. As the boat moves, the planer board app track (and optionally the lure track) is updated which correspondingly moves the track. The interval at which the planer board track is updated is from 0.5 seconds, or 1 second, or 5 seconds, or 10 seconds to 30 seconds, or 45 seconds, or 60 seconds.

The planer board app 12 includes a user interface, such as a graphical user interface as disclosed above. The planer board app 12 is configured to display the planer board track on the user interface (and optionally display the lure track and/or the planer board information). FIG. 1 shows user interface 18. In an embodiment, the user interface is present on a mobile device, such as a smartphone (in FIG. 1), for example.

In an embodiment, the system 10 includes an aquatic locator and the planer board app 12 communicates with the aquatic locator. The planer board app 16 subsequently displays the moving planer board track (and, optionally displays the moving lure track) on a cartography, or other map of the body of water provided by the aquatic locator.

The user interface 18 displays where the planer boards are being trolled vis-à-vis the planer board track.

In an embodiment, the planer board app 12 can receive inputs for multiple planer boards. For example, a second planer board 120a and a second lure 124 can be used. The user then enters a second lure line length 122 and a second boat line length 126 into the planer board app 12. FIG. 4 shows boat 28 or a graphical user interface display whereby the system 10 receives user inputs for six planer boards. The planer board app also receives cartography imagery from an aquatic locator (each board with a respective lure). Lure line lengths/boat line lengths can be input into the planer board app 16 for each of the six planer boards. Correspondingly, the system 10 generates and displays planer board tracks (and lure tracks) superimposed upon the cartography imagery from the aquatic locator for each of the planer boards as described above.

Although FIG. 4 shows six planer boards (each with a respective lure) being trolled from boat 28, it is understood that one, two, three four, five, six, seven, eight, nine, 10 or more planer boards with respective lures) line length and boat line length inputs can be input into the planer board app with respective tracks displayed on a user interface as described above.

The present system provides the angler a visual display, and a visual record, of where the planer board/lures have trolled on a given body of water. In this way, the angler can evaluate one or more planer board track(s) realtime during trolling, enabling the angler to navigate a body of water for more effective trolling coverage. In an embodiment, the visual display shows the motion of the boat and the planer boards realtime, enabling the angler to navigate a body of water for more effective trolling coverage.

The present system provides the angler with a tool and method for realtime determination and display of planer board location, such realtime calculations not possible with conventional systems.

Conventional systems utilized by anglers, such as GPS device systems, cannot determine the location of planer boards or lures in relation to a moving boat, in part because conventional GPS device systems do not allow for user inputs of boat line lengths, lure line lengths, and/or the planer board boat side. Other conventional systems that utilize a lure depth analyzer do not determine the location of a planer board, and therefore cannot determine the location of a lure that is connected to a boat via a planer board, let alone to a moving boat in realtime.

The present system automates the process of obtaining information needed to identify a planer board track. It provides an easy-to-use tool that can be incorporated into tools already in use by the angler, avoiding having to add additional equipment. The present system also provides additional functionality in that anglers can make better and more informed choices of equipment (e.g., lure type and lure line type) and equipment positioning (e.g., the left side of the boat or the right side of the boat), with far less angler effort and mathematics skills than has been required in the past.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A system for providing the location of a planer board, the system comprising:
   one or more non-transitory computing devices;
   one or more computer processors;
   (A) a planer board application (planer board app) embodied in instructions stored by the one or more computer devices that, when executed by the one or more computer processors, is configured to:
      (i) receive inputs from a GPS locator module;
   the planer board app further configured to receive user inputs for
      (ii) a lure line length for a planer board; and
      (iii) a boat line length to the planer board;
   (B) the planer board app generating a planer board track based on the inputs from (i)-(iii); and
   (C) the planer board app comprising a user interface, the planer board app further configured to display the planer board track on the user interface.

2. The system of claim 1 wherein the (A)(i) inputs received from the GPS locator include (1) a boat speed and (2) a boat heading; and
   (B) the planer board app generates the planer board track based on the inputs from (i)(1), (i)(2), (ii), and (iii).

3. The system of claim 2 wherein the planer board app calculates a drag angle from the inputs (i)(1), (i)(2), (ii), and (iii); and
   the planer board app generates the planer board track from the drag angle.

4. The system of claim 3, wherein the planer board app generates the planer board track based on changes to the inputs (i)(1), (i)(2), (ii), and (iii) in realtime.

5. The system of claim 4, wherein the planer board app is configured to display the planer board track on a cartography on the user interface.

6. The system of claim 5, wherein the planer board app displays the planer board track on a cartography on the user interface, showing motion of the boat and the planer board track on the display in realtime.

7. The system of claim 1 wherein the planer board app is configured to receive user inputs for:
   (iv) a second lure line length for a second planer board;
   (v) a second boat line length for the second planer board;
   the planer board app generating a first planer board track and a second planer board track based on the inputs from (i)(v); and
   the user interface is configured to display the first planer board track and the second planer board track on the user interface.

8. The system of claim 7 wherein the (A)(i) inputs received from the GPS locator include (1) a boat speed and (2) a boat heading;
   the planer board app generates the first planer board track based on the inputs from (i)(1), (i)(2), (ii), and (iii); and
   the planer board app generates the second planer board track based on the inputs from (i)(1), (i)(2), (iv), and (v).

9. The system of claim 8 wherein the planer board app calculates a first drag angle from the inputs (i)(1), (i)(2), (ii), and (iii);
   the planer board app calculates a second drag angle from the inputs (i)(1), (i)(2), (iv), and (v);
   the planer board app generates the first planer board track from the first drag angle; and
   the planer board app generates the second planer board track from second first drag angle.

10. The system of claim 9, wherein the planer board app generates the first planer board track and the second planer board track based on changes to the inputs (i)(1), (i)(2), (ii), (iii), (iv), and (v) in realtime.

11. The system of claim 10, wherein the planer board app is configured to display the first planer board track and the second planer board track on a cartography on the user interface.

12. The system of claim 11, wherein the planer board app displays the first planer board track and the second planer board track on a cartography on the user interface, showing motion of the boat, the first planer board track, and the second planer board track on the display in realtime.

13. A system for providing the location of a planer board, the system comprising:
- one or more computer devices;
- one or more computer processors;
- (A) a planer board application (planer board app) embodied in instructions stored by the one or more computer devices that, when executed by the one or more computer processors, is configured to:
  - (i) receive inputs from a GPS locator module including
    - (1) a boat speed and
    - (2) a boat heading;
- the planer board app further configured to receive user inputs for
  - (ii) a lure line length for a planer board; and
  - (iii) a boat line length to the planer board;
- (B) the planer board app generating a planer board track based on the inputs from (i)-(iii); and
- (C) the planer board app comprising a user interface, the planer board app further configured to display the planer board track on the user interface based on the inputs from (i)(1), (i)(2), (ii), and (iii).

14. A system for providing the location of a planer board, the system comprising:
- one or more computer devices;
- one or more computer processors;
- (A) a planer board application (planer board app) embodied in instructions stored by the one or more computer devices that, when executed by the one or more computer processors, is configured to:
  - (i) receive inputs from a GPS locator module;
- the planer board app further configured to receive user inputs for
  - (ii) a lure line length for a planer board; and
  - (iii) a boat line length to the planer board;
- (B) the planer board app generating a planer board track based on the inputs from (i)-(iii);
- (C) the planer board app comprising a user interface, the planer board app further configured to display the planer board track on the user interface, and receive user inputs for:
  - (iv) a second lure line length for a second planer board;
  - (v) a second boat line length for the second planer board;
- the planer board app generating a first planer board track and a second planer board track based on the inputs from (i)(v); and
- the user interface is configured to display the first planer board track and the second planer board track on the user interface.

* * * * *